(12) United States Patent
Heed

(10) Patent No.: US 7,399,451 B1
(45) Date of Patent: Jul. 15, 2008

(54) POLLUTION CONTROL

(75) Inventor: Bjorn Heed, Göteborg (SE)

(73) Assignee: Megtec Systems AB, Gothenburg (SE)

( * ) Notice: Subject to any disclaimer, the term of this patent is extended or adjusted under 35 U.S.C. 154(b) by 0 days.

(21) Appl. No.: 09/623,373

(22) PCT Filed: Mar. 8, 1999

(86) PCT No.: PCT/SE99/00343

§ 371 (c)(1),
(2), (4) Date: Aug. 30, 2000

(87) PCT Pub. No.: WO99/47245

PCT Pub. Date: Sep. 23, 1999

(30) Foreign Application Priority Data

Mar. 17, 1998 (SE) .................................. 9800866

(51) Int. Cl.
- *F01N 3/10* (2006.01)
- *B01D 53/34* (2006.01)
- *F23G 7/07* (2006.01)
- *F27D 17/00* (2006.01)

(52) U.S. Cl. ........................ 422/175; 422/172; 422/173; 422/177; 431/5; 431/7; 432/180; 432/181

(58) Field of Classification Search ................ 422/173, 422/175, 177, 172; 431/5, 7, 170; 432/180, 432/181; 122/4 D See application file for complete search history.

(56) References Cited

U.S. PATENT DOCUMENTS

| 3,870,474 A * | 3/1975 | Houston .................... 422/171 |
| 4,741,690 A | 5/1988 | Heed .............................. 431/7 |
| 5,178,101 A | 1/1993 | Bell ................................ 122/4 |
| 5,262,131 A | 11/1993 | Bayer et al. .................. 422/175 |
| 5,397,548 A | 3/1995 | Kritzler et al. |
| 5,589,142 A * | 12/1996 | Gribbon ...................... 422/171 |
| 6,168,770 B1 | 1/2001 | Heed |

FOREIGN PATENT DOCUMENTS

| DE | 4432316 A1 | 3/1996 |
| JP | 61-502484 | 10/1986 |
| JP | 5-508005 | 11/1993 |
| JP | 6-504723 | 6/1994 |
| JP | 7-500280 | 1/1995 |
| WO | 930795 | 4/1993 |

OTHER PUBLICATIONS

European Office Action dated Jan. 31, 2007 for corresponding European Patent Application No. 99912194.0-2113.

* cited by examiner

*Primary Examiner*—Glenn Caldarola
*Assistant Examiner*—Randy Boyer
(74) *Attorney, Agent, or Firm*—Harness, Dickey & Pierce, P.L.C.

(57) ABSTRACT

Device for pollution control where a polluted stream of air or gas is purified from both oxidisable material and nitrogen oxides simultaneously by a combination of regenerative high temperature treatment and catalytic treatment.

15 Claims, 2 Drawing Sheets

↑ - flow direction

↓ - flow direction

POLLUTION CONTROL

BACKGROUND OF THE INVENTION

1. Field of the Invention

The present invention relates to a device for pollution control. More specifically, the present invention relates to device for pollution control where a polluted stream of air or gas is purified from both oxidisable material and nitrogen oxides simultaneously by a combination of regenerative high temperature treatment and catalytic treatment.

2. Description of Related Art

Polluted air and other gases can be purified by heat treatment to such temperatures that the pollutants are oxidised or decomposed. U.S. Pat. No. 4,267,152 and U.S. Pat. No. 4,741,690 describes such processes where the polluted gases are fed through regenerative devices where the heating of a gas is immediately followed by cooling and recovery of the heat content of the gas. In this way heat treatment of the gas to a high temperature can be made in an economical way without a high expenditure of energy.

The incoming raw gas is in these processes successively heated to the high temperature by means of contact with a matrix of solid material capable of heat transfer to the gas. In the solid matrix there is a temperature gradient so that the gas is first successively heated to a maximum temperature. After attaining its maximum temperature the gas is then cooled in an analogous manner by means of contact with a solid matrix of successively lower temperature. In U.S. Pat. No. 4,287,152 the heating and the cooling matrices are separated from each other but used alternatively for heating and cooling purposes according to an alternating direction of gas flow through the matrices. The different matrices are alternatively used for heating and cooling of the gas. In U.S. Pat. No. 4,741,690 there is only one continuous matrix through which the gas flow is being fed. The temperature profile in this matrix is such however that when the gas passes through it is first successively heated to a maximum temperature and then successively cooled.

In both cases the operation is regenerative and the gas is fed in alternating directions through the equipment and is successively first heated to a maximum temperature and then cooled. The maximum temperature employed is such that it is at or above the temperature that is necessary for the intended oxidation or decomposition reaction to take place.

Processes and equipment like these are extensively used for the purification of ventilation air from painting and printing processes. It can also be used for the purification of exhaust gases from internal combustion engines. In this and other cases nitrogen oxides are a part of the pollution problem.

For diesel engines the concentration of nitrogen oxides in the exhaust can reach several thousands of ppm. Good reduction of these nitrogen oxides can be accomplished if the exhaust is first mixed with a corresponding amount of ammonia, urea or other amine compound before it is heat treated in the above described manner. During the heating the mixture will pass through the relevant temperature window for a selective non catalytic reduction (SNCR) reaction where the nitrogen oxides and the amines are transformed to elemental and harmless nitrogen.

Diesel engine exhaust for example can thus be purified in the above described process first during the heating phase when nitrogen oxides are removed and then at the high temperature when soot, aldehydes and other organic matter is oxidised. This way of operation of the equipment is described in European patent number EPC 609 288.

Experience has shown that when the original concentration of nitrogen oxides is more than 1000 ppm a good reduction can be achieved and the concentration nitrogen oxides brought down to a couple of hundred ppm. However when the original concentration already is in this low region as for example in the exhaust from lean burn natural gas engines reduction is very poor.

SUMMARY OF THE INVENTION

The present invention constitutes a way of improving this situation so that the concentration of nitrogen oxides in the outgoing treated gas can be brought down significantly below 50 ppm. The improvement is accomplished by the incorporation of catalytically active zones into the heat transfer matrices of earlier designs.

Device for pollution control where a polluted stream of air or gas is purified from both oxidisable material and nitrogen oxides simultaneously by a combination of regenerative high temperature treatment and catalytic treatment.

DESCRIPTION OF THE INVENTION

Figure 1:
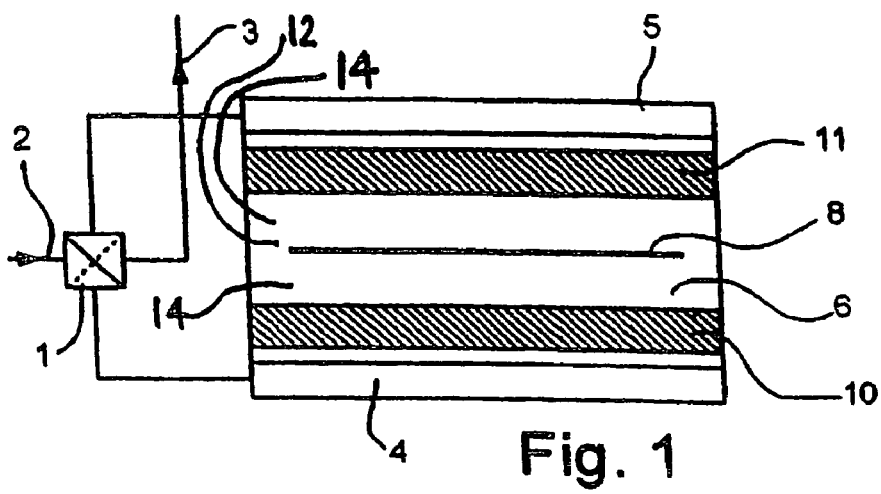
FIG. 1 is a cross section of a pollution control device.
Figure 2:
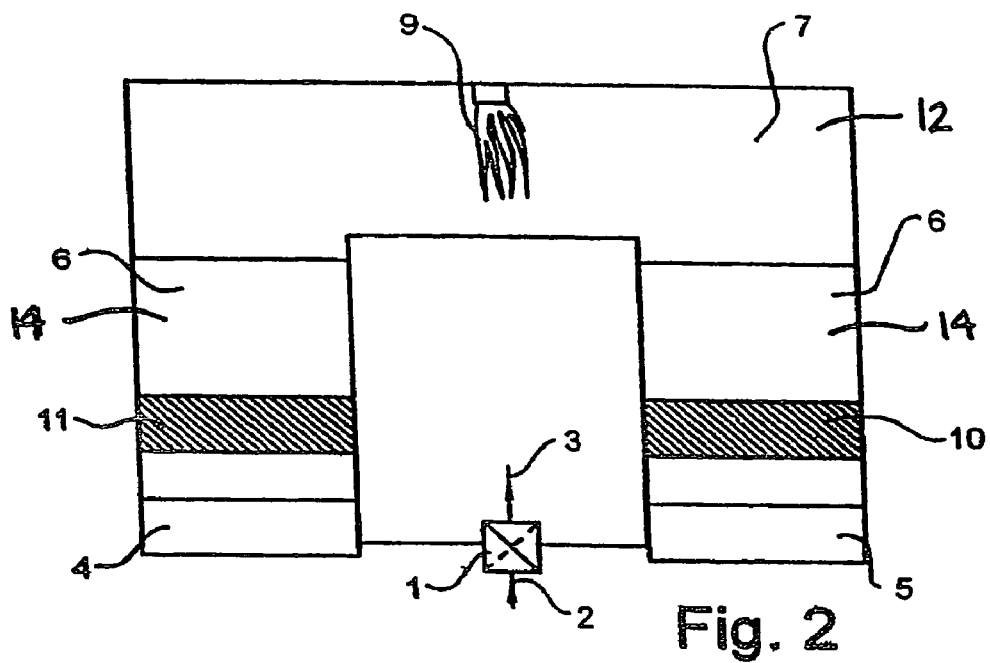
FIG. 2 is a cross section of an alternative pollution control device.

An embodiment of the invention is described in FIG. 1 and another embodiment of the invention is described in FIG. 2. In both figures, reference character 1 is a valve mechanism for the direction of air (gas) in alternating directions through the equipment. Reference characters 2 and 3 are connecting ducts for incoming raw and outgoing cleaned gas respectively. Reference characters 4 and 5 are wind boxes for distribution and collection of air (gas) that goes through the heat transfer matrix 6. In the design shown in FIG. 1, the matrix is divided into two parts 6 and 6' surrounding a combustion chamber 7 which is absent in the design shown in FIG. 1 where the heat exchanging matrix stretches all the way between the two wind boxes 4 and 5. Both designs include means for heating in a hot zone 12: in FIG. 1, in the form of electric heaters 8; and in FIG. 2, in the form of a burner 9. Both designs also incorporate catalytically active zones 10 and 11 within the heat exchanging matrices. The catalytically active zones are separated from the hot zone 12 by at least one intermediate zone 14. In the design of FIG. 1, the temperature is high in the center, or hot zone 12, of the heat exchanging matrix 6 and gradually decreases towards top and bottom. In the design in FIG. 2, the temperature is high In the hot zone 12 or in the combustion chamber 7, and the upper parts of the intermediate zones 14 of heat exchanging matrixes 6 and 6'. The temperature gradually decreases towards the bottom of the heat exchanging matrices. By regenerative heat exchange and regular switching of the direction of flow through the equipment, these temperature patterns can be generally maintained without excessive heat demands being put on the heating means 8 (FIG. 1) and 9 (FIG. 2). When the oxidation of pollutants in the gas stream produces enough energy, they can be switched off altogether.

In operation, raw polluted gas is first mixed with ammonia, urea, or other compound able to act as a selective nitrogen oxides reducing agent. The mixture is then introduced into a cold end of a heat exchanger matrix and by passing through the heat exchanger matrix, the mixture is successively heated to oxidation or decomposition temperature which is attained in the inner part of the equipment, i.e., the hot center of the matrix in FIG. 1 including the hot zone 12 and at least a portion of the intermediate zone 14; or the intermediate zone 14 at the uppermost parts of the matrices 6 and 6' and the hot zone 12 in the combustion chamber 7 in FIG. 2. Before reaching this high temperature, however, the mixture is passed through the catalytically active zone 10, 11 of the heat exchanger matrix 6 or 6'. Here, nitrogen oxides react with the mixed in reducing agent so as to be removed. The catalytic zone 10, 11 is placed in the heat exchanging matrix in such a way that the temperature conditions are favorable for this reduction and a selective catalytic reaction (SCR) takes place. The reaction takes place at a substantially lower temperature than an SNCR reaction and this together with the use of catalyst makes a more thorough reduction possible as compared with an operation according to European patent EPC 609 288. Further, lower levels of concentration of nitrogen oxides are obtainable, e.g., when the inlet concentration of nitrogen oxides is low, the difference becomes significant.

After the SCR reaction the gas mixture is further heated and as in European patent EPC 609 288 other pollutants as well as any remaining surplus of reduction agents are destroyed in the hot inner part.

In operation of regenerative equipment like this the direction of gas through the equipment is reversed at regular intervals. Unless special precautions are taken, at every change in flow direction some untreated gas mixture is being "short circuited" or carried over to the outlet. It is then advantageous to interrupt the supply of reducing agent for a short period before such changes in flow direction. Unnecessary emissions of reducing agent is then avoided.

Figure 3A:
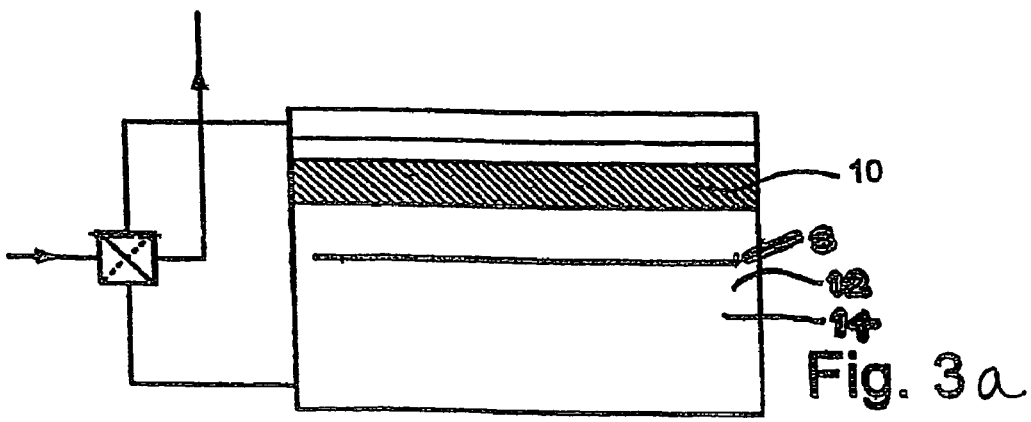
FIG. 3a is a cross section of an alternative pollution control device.
Figure 3B:
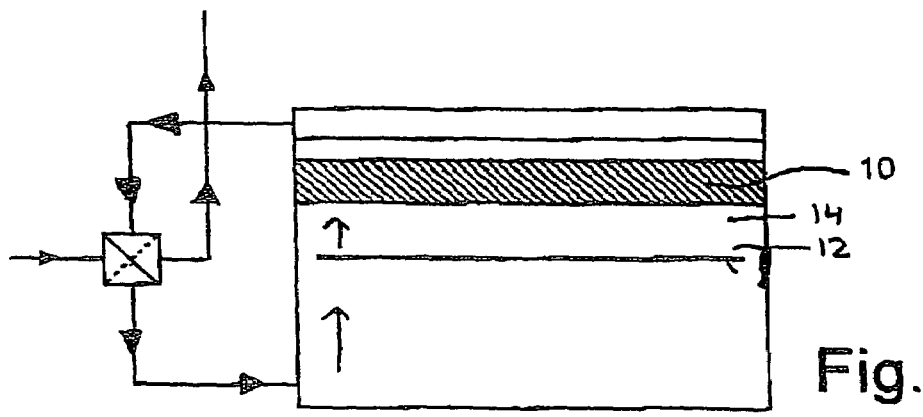
FIGS. 3b and 3c are cross sections of alternative pollution devices with directional gas flow.
Figure 3C:
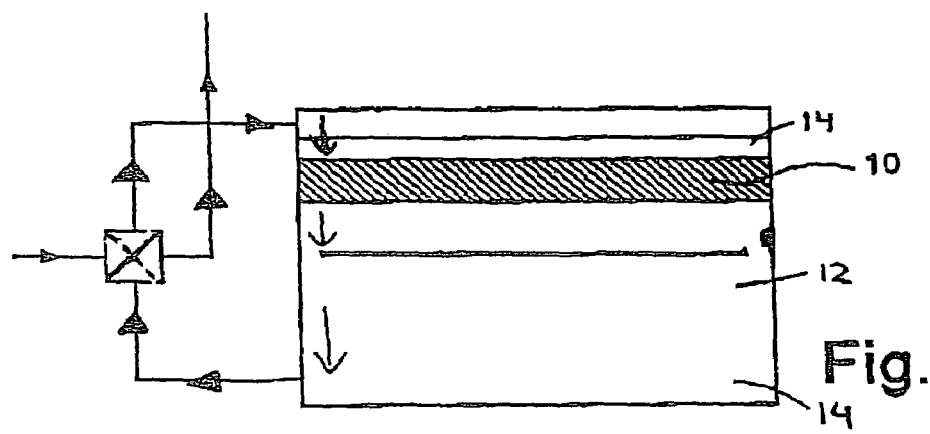

An important aspect of the invention is that catalyst can be applied in such a way that the reducing activity of the catalyst is retained for a considerable time after the supply of reducing agent has been interrupted. The overall reduction efficiency of the equipment thus is not disadvantageously affected by such interruptions in the supply of reducing agent. This effect can be so pronounced that the equipment can be modified to comprise only one zone of catalytically active material. This zone is then activated by the supply of reducing agent when this part of the equipment is used as inlet end for the gas stream. When the gas stream is reversed and the active zone is at the outlet end of the equipment the supply of reducing agent is cut off and the reduction of nitrogen oxides takes place in this zone after the high temperature treatment. FIG. 3 shows such a design with only one catalytically active zone 10.

The invention has been described above in the conjunction with regenerative equipment using either one heat exchanging matrix or two different matrices surrounding a combustion chamber. There also are designs using three or more heat exchanging matrices surrounding a common combustion chamber. In some designs the direction of flow through the heat exchanging matrix is changed only gradually in the heat exchanging matrix so that different parts of the same matrix have flow in different directions. This is obtained for instance by rotation of a matrix versus fixed inlet and outlet ports or by the use of a rotating valve system working together with a fixed matrix. Together all these different designs are often called regenerative thermal oxidisers (RTOs). In all the different designs the heat exchanging matrix material is subject to a gas flow that is reversed at regular intervals and the incoming gas is successively heated to a high temperature where oxidation and decomposition takes place. The invention is applicable in all these cases. The design shown in FIGS. 1 and 3 have the advantage that the equipment is compact and can be made comparatively small which very often is an important aspect when used in various conjunctions together with internal combustion engines.

Catalytically active zones can be incorporated in at least one of the matrices and be activated by regular supply of reducing agent. As described above this supply does not have to be continuous. In some cases the raw gas may already contain such reducing agents or the catalyst or combination of catalyst and raw gas be such that no such supply is necessary.

The invention claimed is:

1. Equipment for purification of gases adapted to heat the gases in a regenerative process to oxidation or self-decomposition temperature comprising:
a combustion chamber having a temperature of at least the oxidation or self-decomposition temperature; a supply mechanism to mix reducing agents with the gases to form a mixture and to supply the mixture to said combustion chamber via at least one heat exchanging matrix;
said heat exchanging matrix including a first and a second portion, wherein said first portion is a catalytically active zone having a temperature below the oxidation or self-decomposition temperature and that is catalytically active in promoting reduction of nitrogen, and said second portion is located between said combustion chamber and said first portion to form an intermediate zone.

2. Equipment according to claim 1, wherein the supply mechanism includes a duct, said duct adapted to supply the reducing agents that reduce nitrogen oxides to the matrix.

3. Equipment according to claim 2, further comprising
a supply interrupt mechanism arranged and constructed to interrupt a supply of the reducing agents for a short period in connection with a change of direction of gas flow through the equipment.

4. Equipment according to claim 2, wherein the zones are arranged such that gas flowing through the equipment encounters the catalytic zone before the combustion zone.

5. Equipment according to claim 1, wherein the matrix is arranged such that the gas can flow in a first direction in which the gas encounters the catalytic zone before combustion zone and such that the gas can flow in a second direction in which the gas encounters the combustion zone before it encounters the catalytic zone.

6. Equipment according to claim 5, wherein the equipment is adapted such that the gas flows only one direction at a time.

7. Equipment according to claim 5, wherein the supply mechanism includes a duct for providing a supply of the reducing agents wherein the matrix is arranged such that the gas flows only one direction at a time and the duct is adapted to maintain a supply of the reducing agents only when the gas flows in the first direction.

8. Equipment for purification of gases adapted to heat the gases in a regenerative process to oxidation or self-decomposition temperature comprising:
a single heat exchanging matrix including two catalytically active zones separated from each other by an intermediate portion
a supply mechanism to mix reducing agents with gases to form a mixture and to supply the mixture to said heat exchanging matrix, and
a heater arranged in said intermediate portion of said heat exchanging matrix and separated from each catalytically active zone by a respective intermediate zone,
wherein each catalytic zone has a temperature below the oxidation or self-decomposition temperature.

9. Equipment according to claim 8, wherein the supply mechanism includes a duct, said duct adapted to supply the reducing agents that reduce nitrogen oxides to the matrix.

10. Equipment according to claim 9, further comprising a supply interrupt mechanism arranged and constructed to interrupt a supply of the reducing agent for a short period in connection with a change of direction of gas flow through the equipment.

11. Equipment according to claim 9, wherein the zones are arranged such that gas flowing through the equipment encounters the catalytic zone before the combustion zone.

12. Equipment for purification of gases comprising:
   at least one heat exchanging matrix, said matrix adapted to heat the gases in a regenerative process to oxidation or self-decomposition temperature and a catalytic process, the at least one heat exchanging matrix including at least three zones, at least one zone is a catalytic zone having a temperature below the oxidation or self-decomposition temperature that is catalytically active in promoting reduction of nitrogen oxides, and at least one zone is a combustion zone, having a temperature of at least the oxidation or self-decomposition temperature, each said catalytic zone is separated from each said combustion zone by an intermediate matrix zone counted in the direction of flow, wherein an Intermediate matrix zone has a temperature reducing effect on said mixture prior to entering the catalytic zone; and
   a supply mechanism to mix reducing agents with the gases to form a mixture and to supply the mixture to the at least one heat exchanging matrix.

13. Equipment according to claim 12, wherein the supply mechanism includes a duct, said duct adapted to supply reducing agents that reduce nitrogen oxides to the matrix.

14. Equipment according to claim 13, further comprising a supply interrupt mechanism arranged and constructed to interrupt a supply of the reducing agent for a short period in connection with a change of direction of gas flow through the equipment.

15. Equipment for purification of gases comprising:
   a single heat exchanging matrix, said matrix adapted to heat the gases in a regenerative process to oxidation or self-decomposition temperature, the heat exchanging matrix including two catalytic zones that are catalytically active and situated on each side of a center combustion zone of the matrix and at least one intermediate matrix zones, each catalytic zone is separated from the center combustion zone by said at least one intermediate zones counted in the direction of flow, wherein said intermediate matrix zone has a temperature reducing effect on mixture gases prior to entering the catalytic zone and each catalytic zone has a temperature below the oxidation or self-decomposition temperature; and
   a supply mechanism to mix reducing agents with the gases to form a mixture and to supply the mixture to the single heat exchanging matrix.

\* \* \* \* \*